United States Patent Office 3,065,538

Patented Nov. 27, 1962

3,065,538

SOLDERING METHOD AND COMPOSITION

Horst Melchiors and Georg Witte, Bonn (Rhine), Germany, assignors to Kuppers Metallwerk G.m.b.H., Bonn (Rhine), Germany, a corporation of Germany No Drawing. Filed Nov. 29, 1957, Ser. No. 699,467
Claims priority, application Germany Dec. 5, 1956
12 Claims. (Cl. 29—496)

This invention relates to a new soldering method and composition. The invention more particularly relates to an improved method and soldering composition for soldering lugs to the conductive metal forming a circuit on a non-conductive base.

Many electrical instruments and devices, as for example, in the communications arts, utilize circuits formed by a conductive metal on a non-conductive base, as, for example, printed circuits formed with the conventional printed circuit technique and circuits formed by plating or the like. The non-conductive base generally is made of a plastic material whereas the circuit is generally formed from copper or a similar metal.

In forming connections with the circuit, wires, terminals or lugs generally are connected to the conductive metal of the circuit at various fixed points. For this purpose, as, for example, in connection with switchboards and similar items, holes are prepared through the plastic base from the side which is free from the conductive material to the side which contains the conductive metal, as, for example, from the non-printed to the printed side and the wires, terminals or the like which will be generically referred to in the claims as lugs, are inserted through the holes from the non-conductive to the conductive side and soldered in place.

The soldering is conventionally effected by a dip process in which, after the application of a suitable flux, the printed side of the base with the protruding lugs is dipped in a tin solder bath and the excess tin is removed, as for example, by shaking. In this manner the large number of electrical connections, as, for example, up to 100 or more may be simultaneously produced by one dip.

Dip soldering, however, has a number of disadvantages. The consumption of the solder is relatively high since the same, not only adheres at the junction points where the solder is desirable, but also adheres to the other portions of the circuit, and may even, due to this, cause an excessively high frequency resistance due to skin effect and, furthermore, undesirable solder bridges may form across portions of the circuit resulting in short circuits and considerable disturbances in operation.

The nature of the conventional dip soldering process does not permit the use of flux of strong action since the layer of flux remains between the solder bath and the surface of the board during the entire time of soldering and accordingly, traces of flux remain on the surface of the board after the board has been removed from the bath, which may cause corrosion.

Additionally, the solder bath becomes contaminated by the absorption of copper from the board, and as a result of this, the melting point of the solder alloy is unfavorably affected until the solder may finally reach a temperature which has injurious action on the material of the board, which is plastic. Furthermore, due to the change in the solder alloy the solder becomes more viscous, leading to the formation of solder threads.

After removal from the bath, drops of solder solidify at the end of the lugs instead of forming at the contact points between the lug and the base conductive metal where the same is desirable. Very often it is necessary to mechanically remove these solder drops.

One object of this invention is to eliminate the above mentioned disadvantages. Still further objects will become apparent from the following description:

In accordance with the invention, in the method for soldering lugs to the conductive metal forming a circuit on a non-conductive base, the above mentioned disadvantages are eliminated by applying the solder as a solder paste to the lugs, and thereafter heating the lugs to cause the paste to flow down the lugs and fuse at the points of contact between the lugs and conductive metal.

The solder paste used in accordance with the invention, comprises a mixture of powdered solder, a resin, preferably colophony, an activator, preferably a salt of an amino acid ester such as glycocolethylesterhydrochloride ($HCl.NH_2.CH_2.COOC_2H_5$) and a solvent having a boiling point varying by not more than 50° C., preferably varying not more than 20° C., from the melting point of the solder, as, for example, a mixture of tetralin and pine oil, and the paste may additionally contain perfume, for example of some pleasant odor.

The solvent dissolves the resin at normal temperature and makes possible to better distribute the activator in the resin. This solder paste is so employed that it is distributed on the tips of the solder lugs or on their surface so that upon heating to a soldering temperature it flows downward on the solder lugs to the contact point and forms the solder connection there. A certain flowing down of the solder paste to the point of contact can also take place between the application of the solder paste and the actual soldering or heating to soldering temperature.

This method has the great advantage that the plastic board with the layer of copper contained thereon comes only slightly, if at all, in contact with the solder paste, thus avoiding the disadvantages of the known processes such as short circuits, large-area heating and the like. Furthermore, the invention has the additional advantage that the solder itself is applied in all cases only at the solder point or solder lug so that it cannot, as occurs in the case of solder-tin baths, take on copper in injurious quantities resulting in the loss of certain quantities of solder tin, due to excessively high absorption of copper. Furthermore, in the method in accordance with the invention, the soldering is more dependable and there are obtained better solder connections than in the known methods.

The method, in accordance with the invention, can be carried out, for instance, in the manner that the parts introduced into the holes of the switchboard or the like, and the solder lugs of the parts which extend out of the holes, are then provided with the necessary quantity of solder paste only at their tips by immersion in a layer of solder paste. The board is then turned upside-down so that the solder paste flows downward from the top of the lugs to the contact point, particularly upon heating to soldering temperature.

The application of the solder paste to the ends of the solder lugs can also be effected by means of nozzles which are so arranged that each solder lug is provided with a drop of solder paste emerging from the corresponding nozzle. The effecting of the soldering proper then takes place in the manner described above. The holes in the board can also be provided with the necessary quantity of solder paste, before the introduction of the lugs. As each lug is introduced in a hole, it is coated over its entire surface with a coating of solder paste which during the further course of the soldering process again flows down to the contact point at which the soldering then takes place.

Depending on the thickness with which it is desired to solder the contact point, a corresponding portion of the paste may be allowed to drip off after the application to the lugs, as, for example, after the dipping. This can also be effected by centrifuging, and it is also possible to dry the paste with heat before the actual heating or soldering process.

In the soldering process itself, the ends of the solder lugs to which the soft solder mass is applied are turned upward and then heated to the soldering temperature. This has the effect that upon the heating of the solder points, for instance, in a pusher oven, the flux first starts to act and immediately thereafter the solder starts to flow.

This has the great advantage that the board need be heated only on the solder side, and need not be oven heated as, for example, above 120° C., and that the solder flows to where it is desired, namely downward to the contact point.

The invention is particularly useful for mass production soldering with printed circuits.

In addition to being economical and dependable the novel soldering process affords the particular advantage from an economic standpoint, that only very simple two-stage operating belts are necessary even for full-mechanical soldering with printed circuits, at relatively low soldering temperatures.

Instead of nozzles, rollers can also be used to apply the solder paste to the solder lugs, the surface of said rollers bearing the layer of solder paste. If one proceeds in such a manner that the roller bearing the solder paste is moved over the upward facing solder lugs, there is still the further advantage that it is no longer necessary to turn the board over in order to effect the soldering. This embodiment of the invention, furthermore, makes it possible to effect the soldering in any desired position of the switchboard or the like.

The actual heating to the soldering temperatures may be effected in any desired manner, as, for example, the known pusher type furnaces which may operate in accordance with the radiation principle or the principle of resistance heating or of high frequency heating, or with soldering irons—preferably heat controlled soldering irons—which are preferably so made that they can take care of a plurality of solder points simultaneously. The soldering irons may in this connection be of flat or cylindrical shape. In this way, the heat is applied via the lugs which primarily require the soldering heat to the printed layer of base metal in a short period of time and in the quantity required for the soldering process.

This embodiment of the invention has the advantage of lower temperatures and a gentler treatment of the plastic board which in this case need be heated only to a low temperature, for instance 150° C.

Instead of these multiple-soldering irons carbon contacts operated by resistance soldering can also be used, particularly in the case of printed soft-solder coatings.

As soft solder there can be employed to particular advantage, a mixture which consists of clouded solder tin, resin (colophony), and activators of the glycocolethylesterhydrochloride ($HCl.NH_2.CH_2.COOC_2H_5$) type, and furthermore contains as solvent a mixture of tetrolin and pine oil, as well as possibly a perfume, for instance bornyl acetate. This composition scarcely thickens at all, and does not harden even upon standing in the open air for a long time, as, for example, eight days and more. The soldering places are extremely resistant to corrosion and after the soldering have a resin coating so that inter alia a rapid evaporation of the activator and a low chlorine content are of decisive importance. The solder places are always smooth, of uniform spread and without formation of beads. Furthermore, no splattering takes place upon the soldering since the solvents evaporate more difficultly than known solvents, without, however, increasing the time of the soldering process.

A composition of the soft solder which has proven particularly suitable consists, for instance, of:

| | Percent |
|---|---|
| Powdered solder (alloy 67/33–30/70)[1] | 88.0 |
| Colophony | 7.5 |
| Activator: Glycocolethylesterhydrochloride (this is the ethylester of amino acetic acid with an addition of hydrochloric acid, $HCl.NH_2.CH_2COOC_2H_5$) | 0.3 |
| Tetralin[2] | 2.5 |
| Pine oil[2] | 1.5 |
| and possibly | |
| Bornylacetate (perfume) | 0.2 |

[1] The term (alloy 67/33–30/70) as used in the examples and claims identifies a solder alloy which contains 67–30% tin and 33–70% lead.

[2] Solvent.

Particularly smooth solder connections with a firm uniform resin coating can be obtained in this connection also by using solder compositions in which the melting point of the solder and the boiling point of the solvent are as close as possible to each other. The activators of the solder are advisedly adapted to the composition of the mass. Since the solvent begins to boil only in the vicinity of the melting point of the solder, the resin mix is thinly liquid at the time of the soldering and surrounds the metal drop after cooling in the form of a dense smooth lacquer which at the same time protects the solder in an extremely simple manner against all corrossion. If the boiling point of the solvent is the same as the melting point of the metal a uniform distribution of the powdered solder, resin and activator is still present at the moment of soldering.

The solder connection will, however, be rough and the lacquer-like coating of resin, for instance colophony, is no longer smooth and coherent if the solvent evaporates too early, i.e. has a boiling point which is more than 50° below the melting point of the metal. Solvents, the boiling point of which is only about 20° higher or lower than the melting point of the metal have been found particularly favorable. If the solvent boils at a temperature substantially higher than the temperature at which the metal melts, the resin coating, after the completion of the soldering, is slightly smeary and the soldering time is substantially increased, which is of importance in particular for rapid soldering processes for which the solder composition, in accordance with the invention, is particularly intended.

For solder compositions which contain resin, a number of activators are known. There are preferred alkylated ammonium salts, heterocyclic nitrogen compounds, carboxylic acids, fatty acids and urea. The activator used by way of example in the solder composition of the invention, consists of salts of amino acid esters. They have the advantage that they are readily compatible with the solvents in accordance with the invention, which consist, for instance, of higher hydrocarbons and terpenes and due to their other chemical composition they develop an excellent rapid activator action.

As resin components of solder compositions there are ordinarily employed colophony and improved colophony resins, since they are cheaper than synthetic resins which are also suitable, the latter in most cases, however, having the disadvantage that they are less resistant to temperature.

Since the melting points of the customary solder alloys is in the range of 180 to 280° C., depending on the tin content which in general is 20 to 67%, there are particularly suited for the solder compositions of the invention, solvents which boil within the temperature range of from about 160 to 300° C. and are correspondingly selected. Suitable solvents are, for instance, aliphatic or aromatic hydrogenated or unsaturated hydrocarbons, higher boiling mono- or polyvalent alcohols and corresponding esters. In the examples there is listed in detail the composition of individual solders with different metal melting points.

The following examples are given by way of illustration and not limitations.

*Example 1*

88% by weight of a commercial powdered solder consisting of a 50/50 tin-lead alloy which melts at 218° C., was stirred together with a mixture of the components set forth in detail below so as to form a solder composition. The solvent mixture boils within the range of 200 to 210° C.

| | Percent |
|---|---|
| Resin | 7.5 |
| Pine oil | 1.5 |
| Tetralin | 2.5 |
| Glycocolyethylesterhydrochloride ($HCl.NH_2.COOC_2H_5$) | 0.3 |
| Bornylacetate (perfume) | 0.2 |

This flux combination is suitable in general for commercial tin alloys of 60 to 40% Sn.

*Example 2*

From 88 parts by weight of the powdered solder consisting of a 60/40 tin-lead alloy of a melting point of 180° C., a solder composition was prepared with 7.5% resin, 0.5% glycocolethylesterhydrochloride $$(HCl.NH_2.CH_2.COOC_2H_5)$$

and a mixture of 2% butylene glycol and 2% terpinol. The solvent mixture boils within the range of 200 to 210° C.

*Example 3*

The soft solder composition was prepared in the same manner as in Examples 1 and 2. The individual components were as follows:

| | Percent |
|---|---|
| Tin-lead alloy 20/80 [1] | 88.0 |
| Dimethylphthalate [2] | 4.0 |
| Resin | 7.5 |
| Glycocolethylesterhydrochloride ($HCl.NH_2.CH_2.COOC_2H_5$) | 0.3 |
| Bornylacetate | 0.2 |

[1] Melting point, 278° C.
[2] Boiling point, 284° C.

*Example 4*

The solder composition was prepared in the same manner as in Examples 1 and 2. The individual components were as follows:

| | Percent |
|---|---|
| Tin-lead alloy 40/60 [1] | 88.0 |
| Methylbenzylalcohol [2] | 4.0 |
| Resin | 7.5 |
| Glycocolethylesterhydrochloride ($HCl.NH_2.CH_2.COOC_2H_5$) | 0.3 |
| Bornylacetate | 0.2 |

[1] Melting point, 251° C
[2] Boiling point, 220° C.

These solder compositions can also be advantageously employed for other methods, particularly those in which there are concerned solder joints which are difficult to reach with a soldering iron, and from which in addition to a good heating action high resistance to corrosion is required.

We claim:

1. In the method for soldering lugs to the conductive metal forming a circuit on a non-conductive base by applying the solder as a solder paste to the lugs and thereafter heating the lugs to cause the paste to flow down the lugs and fuse at the points of contact between the lugs and the conductive metal, the improvement which comprises employing a solder paste comprising a mixture of 88% of a tin-lead solder selected from the group consisting of 50% tin-50% lead alloy solder, 60% tin-40% lead alloy solder and 20% tin-80% lead alloy solder, 7.5% colophony, 0.3% glycocolethylesterhydrochloride, 0.2% bornylacetate, and 4% of a solvent selected from the group consisting of dimethylphthalate, methylbenzyl alcohol, tetralin (2.5%) and pine oil (1.5%), and butylene glycol (2%) and terpinol (2%).

2. In the method for soldering lugs to the conductive metal forming a circuit on a non-conductive base by applying the solder as a solder paste to the lugs and thereafter heating the lugs to cause the paste to flow down the lugs and fuse at the points of contact between the lugs and the conductive metal, the improvement which comprises employing a solder paste comprising a mixture of 88% of a tin-lead solder selected from the group consisting of 50% tin-50% lead alloy solder, 60% tin-40% lead alloy solder, and 20% tin-80% lead alloy solder, 7.5% colophony, 0.5% glycocolethylesterhydrochloride, and 4% of a solvent selected from the group consisting of dimethylphthalate, methylbenzyl alcohol, tetralin (2.5%) and pine oil (1.5%), and butylene glycol (2%) and terpinol (2%).

3. In the method for soldering lugs to the conductive metal forming a circuit on a non-conductive base by applying the solder as a solder paste to the lugs and thereafter heating the lugs to cause the paste to flow down the lugs and fuse at the points of contact between the lugs and the conductive metal, the improvement which comprises employing a solder paste comprising a mixture of:

| | Percent |
|---|---|
| Powder solder which is an alloy consisting of 67–30% tin and 33–70% lead | 88.0 |
| Colophony | 7.5 |
| Glycocolethylesterhydrochloride which is ($HCl.NH_2.CH_2.COOC_2H_5$) | 0.3 |
| Tetralin | 2.5 |
| Pine oil | 1.5 |
| Bornylacetate | 0.2 |

4. In the method for soldering lugs to the conductive metal forming a circuit on a non-conductive base by applying the solder as a solder paste to the lugs and thereafter heating the lugs to cause the paste to flow down the lugs and fuse at the points of contact between the lugs and the conductive metal, the improvement which comprises employing a solder paste comprising a mixture of:

| | Percent |
|---|---|
| Powder solder consisting of a 50% tin-50% lead alloy | 88.0 |
| Colophony | 7.5 |
| Tetralin | 2.5 |
| Pine oil | 1.5 |
| Bornylacetate | 0.2 |
| Glyocolethylesterhydrochloride ($HCl.NH_2.CH_2.COOC_2H_5$) | 0.3 |

5. In the method for soldering lugs to the conductive metal forming a circuit on a non-conductive base by applying the solder as a solder paste to the lugs and thereafter heating the lugs to cause the paste to flow down the lugs and fuse at the points of contact between the lugs and the conductive metal, the improvement which comprises employing a solder plaste comprising a mixture of:

| | Percent |
|---|---|
| Powdered solder consisting of a 60% tin and 40% lead alloy | 88.0 |
| Colophony | 7.5 |
| Glycocolethylesterhydrochloride ($HCl.NH_2.CH_2.COOC_2H_5$) | 0.5 |
| Butylene glycol | 2.0 |
| Terpinol | 2.0 |

6. In the method for soldering lugs to the conductive metal forming a circuit on a non-conductive base by applying the solder as a solder paste to the lugs and thereafter heating the lugs to cause the paste to flow down the lugs and fuse at the points of contact between the lugs and the conductive metal, the improvement which comprises employing a solder paste comprising a mixture of:

| | Percent |
|---|---|
| Powdered solder consisting of a 20% tin and 80% lead alloy | 88.0 |
| Dimethylphthalate | 4.0 |
| Colophony | 7.5 |
| Glycocolethylesterhydrochloride ($HCl.NH_2.CH_2.COOCH_2H_5$) | 0.3 |
| Bornylacetate | 0.2 |

7. In the method for soldering lugs to the conductive metal forming a circuit on a non-conductive base by applying the solder as a solder paste to the lugs and thereafter heating the lugs to cause the paste to flow down the lugs and fuse at the points of contact between the lugs and the conductive metal, the improvement which comprises employing a solder paste comprising a mixture of:

| | Percent |
|---|---|
| Powdered solder consisting of a 40% tin and 60% lead alloy | 88.0 |
| Methylbenzyl alcohol | 4.0 |
| Colophony | 7.5 |
| Glycocolethylesterhydrochloride | 0.3 |
| Bornylacetate | 0.2 |

8. A soldering paste consisting of

| | Percent |
|---|---|
| Powdered solder which is an alloy consisting of 67–30% tin and 33–70% lead | 88.0 |
| Colophony | 7.5 |
| Glycocolethylesterhydrochloride ($HCl.NH_2.CH_2.COOC_2H_5$) | 0.3 |
| Tetralin | 2.5 |
| Pine oil | 1.5 |
| Bornylacetate | 0.2 |

9. A soldering paste consisting of

| | Percent |
|---|---|
| Powder solder consisting of a 50% tin, 50% lead alloy | 88.0 |
| Colophony | 7.5 |
| Tetralin | 2.5 |
| Pine oil | 1.5 |
| Bornylacetate | 0.2 |
| Glycocolethylesterhydrochloride ($HCl.NH_2.CH_2.COOC_2H_5$) | 0.3 |

10. A soldering paste consisting of

| | Percent |
|---|---|
| Powdered solder consisting of a 60% tin and 40% lead alloy | 88.0 |
| Colophony | 7.5 |
| Glycocolethylesterhydrochloride ($HCl.NH_2.CH_2.COOC_2H_5$) | 0.5 |
| Butylene glycol | 2.0 |
| Terpinol | 2.0 |

11. A soldering paste consisting of

| | Percent |
|---|---|
| Powdered solder consisting of a 20% tin and 80% lead alloy | 88.0 |
| Dimethylphthalate | 4.0 |
| Colophony | 7.5 |
| Glycocolethylesterhydrochloride ($HCl.NH_2.CH_2.COOC_2H_5$) | 0.3 |
| Bornylacetate | 0.2 |

12. A soldering paste consisting of

| | Percent |
|---|---|
| Powdered solder consisting of a 40% tin and 60% lead alloy | 88.0 |
| Methylbenzyl alcohol | 4.0 |
| Colophony | 7.5 |
| Glycocolethylesterhydrochloride | 0.3 |
| Bornylacetate | 0.2 |

References Cited in the file of this patent

UNITED STATES PATENTS

| | | |
|---|---|---|
| 1,882,734 | Barber | Oct. 18, 1932 |
| 2,090,846 | Lawson | Aug. 24, 1937 |
| 2,092,191 | Thomas | Sept. 7, 1937 |
| 2,157,918 | Rankin | May 9, 1939 |
| 2,334,609 | Cox | Nov. 16, 1943 |
| 2,461,154 | Hale | Feb. 8, 1949 |
| 2,471,451 | Rinkenbach | May 31, 1949 |
| 2,480,723 | Evans et al. | Aug. 30, 1949 |
| 2,502,291 | Taylor | Mar. 28, 1950 |
| 2,553,226 | Williams | May 15, 1951 |
| 2,598,027 | Weir et al. | May 27, 1952 |
| 2,889,393 | Berger | June 2, 1959 |
| 2,915,678 | Frazier et al. | Dec. 1, 1959 |

OTHER REFERENCES

Hackh's Chemical Dictionary, 3rd edition, 1944, pages 660, 840, published by the Blakiston Company, Philadelphia.